Aug. 6, 1929.  J. ZUBATY  1,723,113
INSTRUMENT PANEL
Filed Jan. 23, 1928
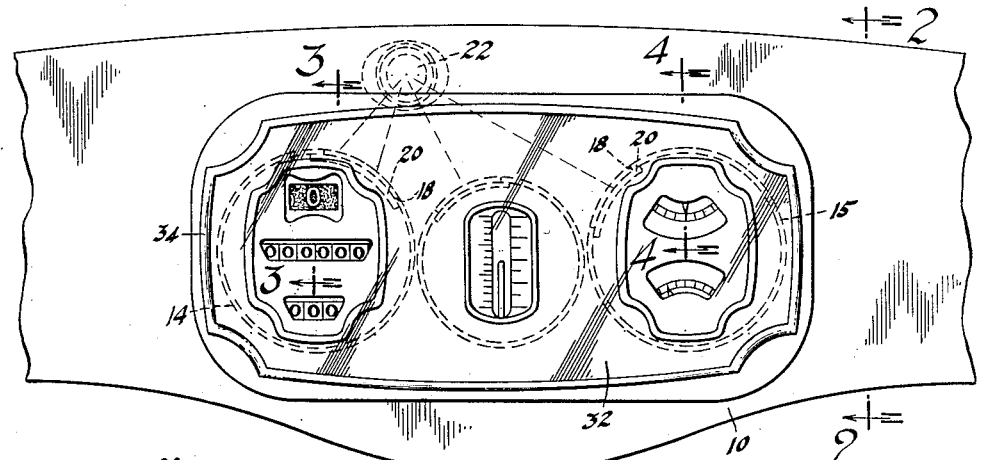
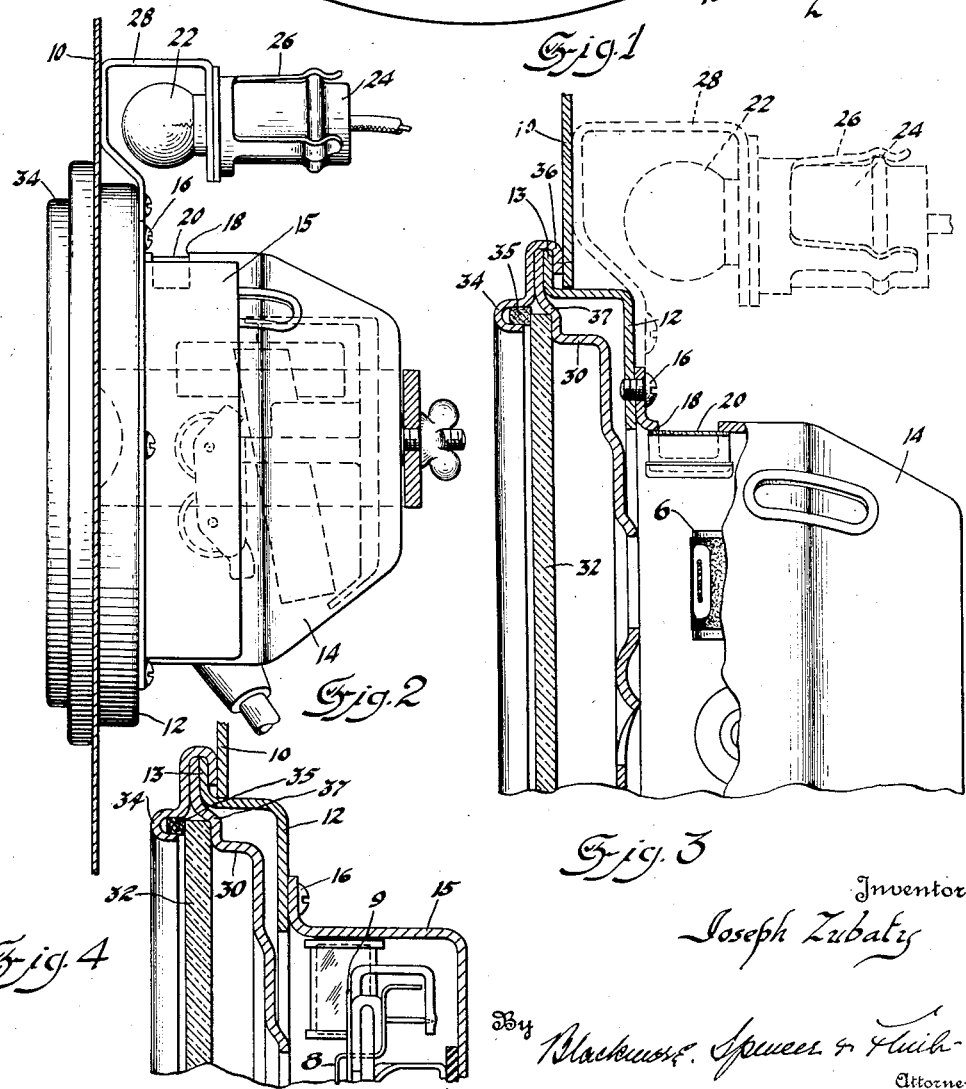
Inventor
Joseph Zubaty
By Blackmore, Spencer & Huih-
Attorneys Patented Aug. 6, 1929.

1,723,113

UNITED STATES PATENT OFFICE.

JOSEPH ZUBATY, OF FLINT, MICHIGAN, ASSIGNOR TO A C SPARK PLUG COMPANY, OF FLINT, MICHIGAN, A COMPANY OF MICHIGAN.

INSTRUMENT PANEL.

Application filed January 23, 1928. Serial No. 248,905.

This invention relates to an instrument panel and more particularly to an instrument panel of the type ordinarily mounted on the dashboard of an automotive vehicle.

In an instrument panel of this type it is desirable to fix the various instruments to a single mounting plate and to cover this mounting plate with a single glass plate, rigidly fixing the parts together to form a dust-proof assembly. In case the necessary light bulb is located inside this dust-proof assembly, dust will be admitted when the light bulb is changed, and will accumulate on the inaccessible inner side of the glass cover plate and on the mechanism of the instruments.

It is an object of the present invention to provide a dust-proof instrument panel of this character in which the light bulb is mounted on the outer and rear side of the instrument panel and in which the instruments are so constructed that the dials thereof may be adequately illuminated from this source of light.

The invention further contemplates use of a suitably apertured cover plate for the supporting or mounting plate. With the light admitted to the various instruments in the rear of both of these plates, and directly into spaces between said cover plates and the instrument dials, the dials only of the instruments will be illuminated. With this construction there will be no light reflected into the driver's eyes by the cover plate, only concealed and reflecting parts thereof being illuminated. Since only part of the light strikes the dials, this construction may, however, provide illumination for the space beneath the cowl, and on the floor of the car adjacent the starter button.

It is an object of this invention to provide an improved instrument panel which is simple and economical in manufacture, strong and durable in construction, and pleasing to the eye.

Other objects and advantages of the invention will appear in the course of the following description, taken in connection with the accompanying drawing and appended claims.

In the drawing:

Fig. 1 is a front view.

Fig. 2 is a side view taken as indicated by the line 2—2 of Fig. 1.

Fig. 3 is a section on the line 3—3 of Fig. 1.

Fig. 4 is a section on the line 4—4 of Fig. 1.

Referring to the drawing, I have illustrated a portion of an instrument board 10, which may be the dash board of an automotive vehicle, which is provided with an aperture shaped to receive an assembled instrument panel. The panel comprises a dished supporting or backing plate 12, formed with a flange 13 and provided with a number of openings for exposing the dials of instruments, the casings 14 and 15 of which are fixed to the backing plate by means of screws 16. Obviously, if desired, rivets or other fastening devices less readily removable may be employed instead of screws.

A circumferential slot 18 covered with a transparent strip 20 of pyralin or similar light-diffusing material is provided in each instrument casing for admitting light from a light bulb 22. The bulb 22 is fixed in a socket 24 removably supported in spring fingers 26 of a bracket 28 fastened to the rear side of the supporting plate 12.

In Figs. 2 and 3 I have illustrated an instrument casing carrying mechanism which includes a rotatable dial 6. The dial is arranged even with the slot 18 in the instrument casing and in rear of the plane of the supporting plate 10 so that it may be well illuminated by the bulb 22. The cover strip 20 may be of any suitable color or character for diffusing or absorbing part of the entering light.

In Fig. 4 is shown the instrument casing 15 which is provided with a fixed dial 9 over which is movable the indicating needle 8. The instrument mechanism is of conventional construction such as that of an ammeter. The dial 9 is even with the slot 18 and in rear of the plane of the supporting plate 10 so that it will be well illuminated from the light bulb 22. In the structure shown in either view the covered slot 18 functions as a window in the casing for admitting light and rendering the structure dustproof.

Fitting over the plate 12 and provided with apertures corresponding in shape and location with the various dials is the ornamental cover plate 30. Plate 30 is formed adjacent its edge with a shoulder 37 in which rests the plain glass cover plate 32. A bezel 34 carrying a gasket 35 pressing against the edge of the glass plate 32 is positioned on the front of the assembled structure and is provided with a portion 36 crimped about the edges of plates 12 and 30 for holding the assembled structure together as a unit. The crimped portion 36 functions as a shoulder abutting against the dash board for holding the assembled structure within the aperture in the dash board. The assembly may be fixed to the dash board by any usual or desired means.

I claim:

1. In an instrument assembly, an instrument panel comprising a single and common apertured plate having a plurality of instruments in separate cases mounted thereon, a common cover plate corresponding therewith in its outside dimensions and provided with separate apertures, respectively registering with said instruments, means for holding said elements against relative displacement, a lighting element mounted adjacent said supporting plate, said instruments being provided with windows on the sides adjacent said lighting element and in rear of said supporting plate and suitably to an admission of light rays directly to a space between said cover plate and the dials of said instruments.

2. In an instrument assembly, an instrument panel comprising a single and common apertured plate having a plurality of instruments in separate cases mounted thereon, a common cover plate corresponding therewith in its outside dimensions and provided with separate apertures, respectively registering with said instruments, a transparent plate over said cover plate, means for holding said elements against relative displacement, and a lighting element mounted adjacent said supporting plate, said instruments being provided with windows on the sides adjacent said lighting element and in rear of said supporting plate and suitably to an admission of light rays directly to a space between said cover plate and the dials of said instruments.

3. In an instrument assembly, an instrument panel comprising a single and common apertured plate having a plurality of instruments in separate cases mounted thereon, a common cover plate corresponding therewith in its outside dimensions and provided with separate apertures, respectively registering with said instruments, means for holding said elements against relative displacement, and a lighting element mounted on said supporting plate, said instruments being provided with windows on the sides adjacent the light and in rear of said cover plate and suitably to an admission of light rays directly to a space between said cover plate and the dials of said instruments said windows comprising light diffusing material.

4. In an instrument assembly, a common supporting plate, instrument casings provided with dials and fixed to said plate, a cover plate corresponding therewith in outside diameter and apertured for exposing the dials, a transparent plate over said cover plate, said instrument casings being provided with openings at the rear of said cover plate, transparent light diffusing covers for said openings, means for holding said elements against relative displacement and sealing them into a dust-proof unit, and a lighting element on the outside of the unit for projecting light through the transparent covers for illuminating the dials.

5. In an instrument assembly, a supporting plate, instrument casings fixed to said plate and provided with dials in the rear of the plane thereof, said casings being provided rearwardly of said plate but forwardly of said dials, with side openings covered with light diffusing material, a cover plate for said instrument plate apertured to expose the dials, means, including a bezel which receives edges of said plates for holding said elements against relative displacement and sealing them into a dust-proof unit, and a lighting element outside of the unit for illuminating the dials.

6. In an instrument assembly, an apertured supporting plate common to a plurality of instruments, instruments including casings mounted on said plate and provided with dials in the rear of the plane thereof and exposed through the apertures in the supporting plate, said casings being provided with openings at the rear of the supporting plate but arranged for the projection of light therethrough and directly on the fronts of dials of the instruments, transparent covers for said openings, a cover for said supporting plate, said supporting plate, casings and transparent covers forming a dust-proof assembly surrounded by a common bezel, and lighting means on the outside of the assembly arranged to project light through the openings in the casings and rearwardly of said last-mentioned cover, to illuminate the dials.

7. In an instrument assembly, an apertured supporting plate common to a plurality of instruments, instruments including casings secured to said supporting plate, said instruments being provided with dials at the rear of the supporting plate and exposed through the apertures therein, a cover plate for said supporting plate provided with apertures for the display of the dials, a transparent cover for said cover plate, said instrument casings being provided with openings exposed at the rear of the supporting plate and adapted for the projection of light therethrough rearwardly of said cover plate, for reflection therefrom upon the dials, transparent covers for said openings, said supporting plate, casings and transparent covers forming a dust-proof assembly surrounded by a common bezel, and a light source mounted at the rear of the supporting plate and arranged to project light through said openings for indirectly illuminating the dials.

In testimony whereof I affix my signature.

JOSEPH ZUBATY.